(12) United States Patent
Tucker et al.

(10) Patent No.: US 8,200,792 B2
(45) Date of Patent: Jun. 12, 2012

(54) DESKTOP SECURE VIDEO TELECONFERENCING

(75) Inventors: Richard Warren Tucker, Lancaster, VA (US); Dean Andrew Woughter, Manassas, VA (US); Donald Scott Patz, Leonardtown, MD (US); David Matthew Tucker, Potomac Mills, VA (US)

(73) Assignee: Freeport Technologies, Incorporated, Herndon, VA (US)

( * ) Notice: Subject to any disclaimer, the term of this patent is extended or adjusted under 35 U.S.C. 154(b) by 319 days.

(21) Appl. No.: 12/538,609

(22) Filed: Aug. 10, 2009

(65) Prior Publication Data
US 2011/0035472 A1 Feb. 10, 2011

(51) Int. Cl.
G06F 15/177 (2006.01)
(52) U.S. Cl. ............... 709/221; 348/230.1; 455/344; 398/2

(58) Field of Classification Search .................... 709/221
See application file for complete search history.

(56) References Cited

U.S. PATENT DOCUMENTS

| 4,686,698 A | * | 8/1987 | Tompkins et al. | ......... 348/230.1 |
| 2009/0087178 A1 | * | 4/2009 | Winegard | ......... 398/2 |

* cited by examiner

Primary Examiner — Michael Y Won
Assistant Examiner — Hua Fan
(74) Attorney, Agent, or Firm — Locke Lord LLP

(57) ABSTRACT

Method, system, and computer program product example embodiments of the invention are disclosed to provide multi-network secure video teleconferencing (VTC) for VTC endpoints. The embodiments of the invention provide distributed components to perform the necessary operations, rather than co-locating the components in the VTC endpoint. Some system components are located with the VTC endpoint, other components are placed in a network operations center (NOC) and still other components are distributed on the various networks.

12 Claims, 5 Drawing Sheets

LCS PROCESS 400

STEP 402: RECEIVING AT A LOCAL CONTROL SYSTEM PROXIMATE TO A VIDEO TELECONFERENCING UNIT, A USER SELECTION OF A NETWORK TO BE USED FOR A VIDEO CONFERENCE;

STEP 404: SELECTIVELY MAINTAINING ISOLATION OF THE VIDEO TELECONFERENCING UNIT FROM THE LOCAL CONTROL SYSTEM VIA AN ISOLATION SWITCH;

STEP 406: SENDING A SIGNAL FROM THE LOCAL CONTROL SYSTEM TO A NETWORK SWITCH AT A NETWORK OPERATIONS CENTER TO CONNECT AN IP NETWORK CONNECTION OF THE VIDEO TELECONFERENCING UNIT TO A NULL CONNECTION;

STEP 408: RECEIVING PERMISSION AT THE LOCAL CONTROL SYSTEM TO CONNECT TO A CONTROL INTERFACE OF THE VIDEO TELECONFERENCING UNIT ;

STEP 410: DATA-CLEANING THE VIDEO TELECONFERENCING UNIT BY THE LOCAL CONTROL SYSTEM AND, IF NECESSARY, FORCING A REBOOT OF THE VIDEO TELECONFERENCING UNIT;

STEP 412: LOADING BASIC NETWORK CONFIGURATION INFORMATION INTO THE VIDEO TELECONFERENCING UNIT BY THE LOCAL CONTROL SYSTEM, ISSUING A REBOOT TO THE VIDEO TELECONFERENCING UNIT, AND DISCONNECTING THE LOCAL CONTROL SYSTEM FROM THE VIDEO TELECONFERENCING UNIT.

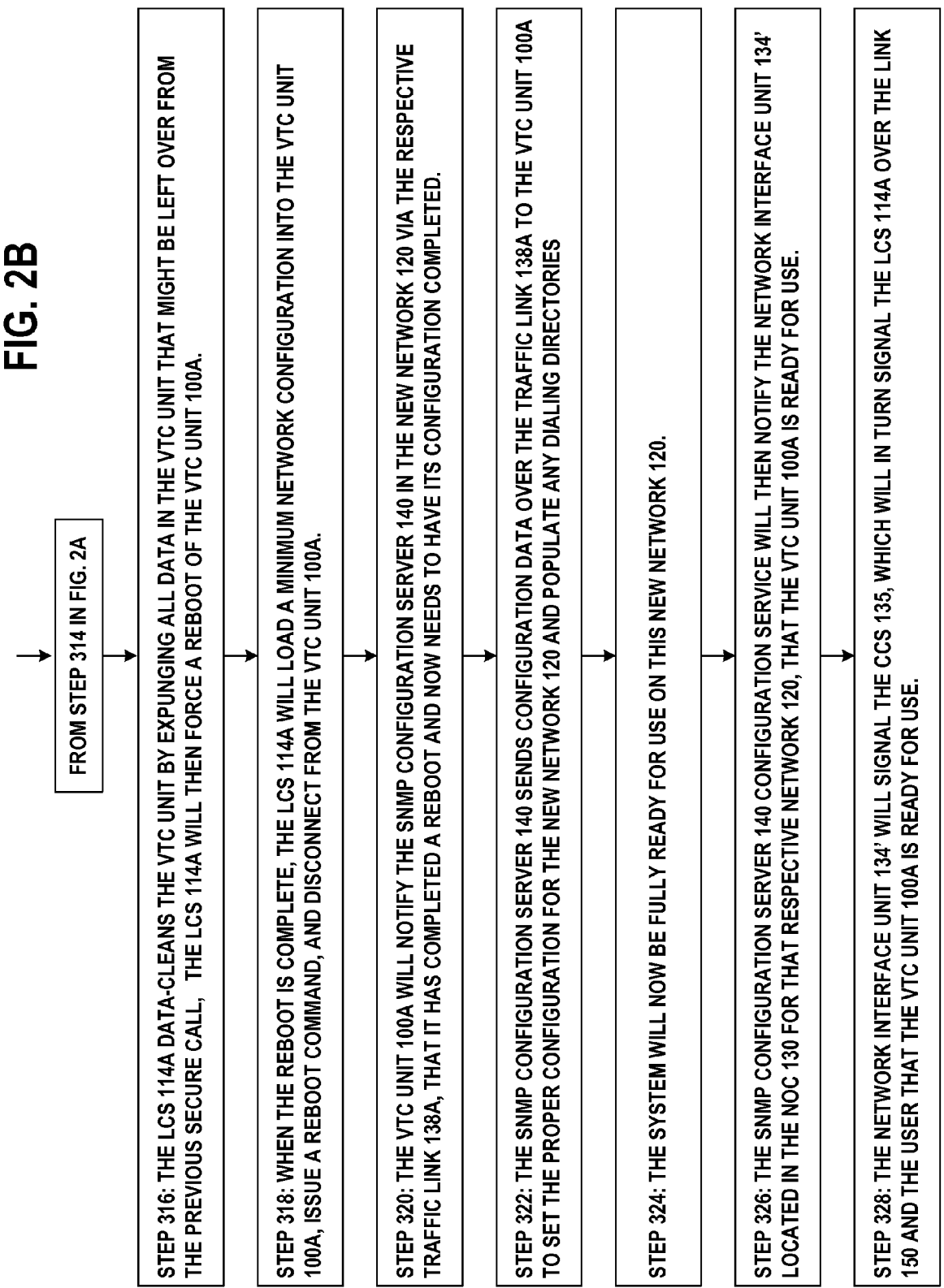

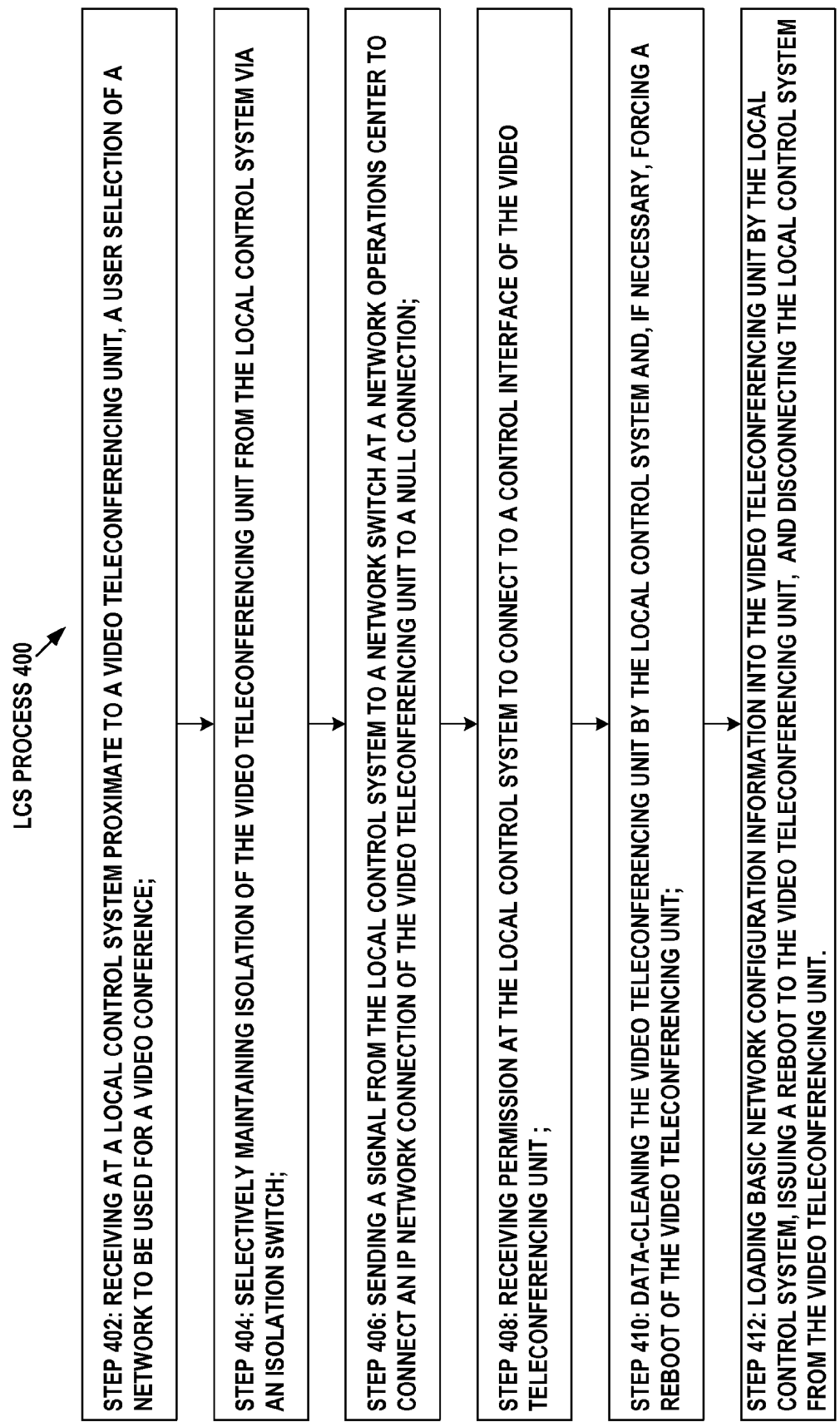

DESKTOP SECURE VIDEO TELECONFERENCING

FIELD

The technical field relates to multi-network secure video teleconferencing (VTC) and more particularly relates to providing multi-network secure video teleconferencing for VTC endpoints.

BACKGROUND

Video teleconferencing (VTC) networks typically interconnect VTC end points, which can range from a limited bandwidth desktop PC connected through the Internet, to elaborate videoconference rooms designed for high quality-of-service communication and equipped with high definition displays requiring a high bandwidth. The networks can range from packet switched Internet links to dedicated, circuit switched trunks that may include international links through undersea fiber optical cables. The protocol used for VTC transmission across circuit switched networks is the H.320 suite of protocols promulgated by the ITU-T for running Multimedia (Audio/Video/Data) over ISDN based networks, which is incorporated herein by reference. The protocols that are commonly used for VTC transmission across IP based networks are the H.323 suite of protocols promulgated by the ITU Telecommunication Standardization Sector (ITU-T) to provide audio-visual communication sessions on any packet network and the SIP protocol that is an Internet Engineering Task Force (IETF) protocol which provides signaling control for voice and video communication sessions, which are incorporated herein by reference.

Where physical and operational security is required for video teleconferencing, the entire VTC system must be configured to support the requisite security. The primary security issue with VTC endpoints is confidentiality, which relates, not only to the confidentiality of VTC traffic on the network, but also to the confidentiality of the collateral information in the room in which the VTC endpoint is placed. In addition, access control needs to be secure to avoid a VTC endpoint being compromised and remotely controlled over an IP network. Because these vulnerabilities are more prevalent in Ethernet/IP based VTC endpoint implementations, extra consideration must be given to the network architecture supporting the VTC endpoint as well as the configuration of the device itself.

Centralized multi-network secure video teleconferencing switching systems provide VTC access to multiple networks using a single VTC system. The U.S. Department of Defense security requirements for such systems have been defined by the Defense Information Security Administration (DISA) in the *Video Tele-Conference Security Technical Implementation Guide*, Version 1, Release 1, Jan. 8, 2008, which is incorporated herein by reference.

Centralized multi-network secure video teleconferencing security systems are currently being deployed in racks along with the audio-visual (AV) equipment required in AV room systems. The cost and size of these units, however, virtually precludes their use for desktop VTC endpoints, to provide Multi-Network switching capability.

What is needed is a multi-network secure video teleconferencing switching system that meets the DISA and other standard security requirements, but in a manner that minimizes cabling to and from VTC endpoints, minimizes the size of the equipment that must be located in an office to support the requirement, minimizes costs of implementation through inexpensive shared resources, and enhances operation, management and control across multiple networks.

SUMMARY

Method, system, and computer program product example embodiments of the invention are disclosed to provide multi-network secure video teleconferencing for VTC endpoints. The embodiments of the invention provide distributed components to perform the necessary operations, rather than co-locating many of the components in the VTC endpoint. Some system components are located with the VTC endpoint, other components are placed in a network operations center (NOC) and still other components are distributed on the various networks.

Example embodiments of the invention allow an individual VTC endpoint to operate across multiple networks of different security levels in a manner that provides security across those networks. That is, the equipment may be used for one conference on a secret network, and then switched over and the same equipment may be used for an unclassified call. The equipment is responsible to data-clean or expunge all data in the VTC endpoint that might be left over from the previous secure call, including logs, IP addresses, images, names, address books and the like.

The desktop multi-network secure switching components include components required at each desktop VTC endpoint, components required for the network operations center (NOC) or video operations center (VOC), and components required for each network.

Components at each desktop VTC endpoint located at a desktop include a desktop VTC unit, an isolation switch, a fiber to Ethernet media converter, and a local control system (LCS).

Components at each network operations center (NOC) or video operations center (VOC) include a fiber network switch (FNS), an isolation switch, a Network Interface Unit for each supported network, a desktop control unit interface, a campus control system (CCS), and optionally a desktop VTC endpoint.

Components in each network include a configuration server with stored configuration data for each desktop VTC endpoint it supports and a network server for operational software, which may optionally be combined with the configuration server.

There are two basic modes of system operation for the desktop multi-network secure switching system: local control and remote control. In local control, the desktop VTC endpoint user selects the network that he or she is interested in conferencing on at his or her local control system (LCS). In remote mode, a remote scheduling system or another remote user accesses the LCS and selects the network for the user's desktop VTC endpoint.

In local control, the VTC user selects the network that is desired to be used for a video conference by pressing the button for that network on the front of the local control system (LCS). For example, the user at a desktop VTC endpoint has completed a previous classified video teleconference on a first network and now wishes to join an unclassified video teleconference on a new network.

The LCS is located near the VTC unit and uses an RS-232 or USB control interface to the VTC unit to perform its data-cleaning operations on the VTC unit.

While the VTC unit is connected to a network, its RS-232 control interface is disconnected from the LCS via the respective isolation switch.

When the user selects a new network on the LCS or selects "off mode", a signal is sent by the LCS via an Ethernet link to the campus control system (CCS) located in the network operations center (NOC) 130.

The CCS will send a select signal via an isolation switch to the fiber network switch (FNS) located in the NOC to take (or leave) the user's VTC unit off of all networks and connect it to a null connection.

When the FNS indicates that the VTC unit is connected to the null network, it will signal the CCS that this condition has been achieved.

The CCS will then notify the LCS via the Ethernet link that it has permission to connect to the VTC unit. The LCS then connects to the VTC unit via its RS-232 control interface through the isolation switch.

The LCS will first data-clean the VTC unit by expunging all data in the VTC unit that might be left over from the previous secure call, including logs, IP addresses, images, names, address books and the like. The LCS will then force a reboot of the VTC unit.

When the reboot is complete, the LCS will load a minimum network configuration into the VTC unit, issue a reboot command, and disconnect from the VTC unit. This network configuration will consist only of the IP address that the VTC unit will use on this network or alternatively instructions for the VTC unit to use DHCP and the address of the SNMP configuration server.

On completion of reboot, the VTC unit will be connected to the new network through the VTC traffic link, the fiber network switch, and the network interface unit. The VTC unit will notify the SNMP configuration server in the new network via the respective traffic link, that it has completed a reboot and now needs to have its configuration completed on the new network.

The SNMP configuration server will then trigger a service that will send configuration data over the traffic link to the VTC unit to set the proper configuration for the new network that it has entered and to populate any dialing directories. Depending on the requirements of the VTC unit, an additional reboot may be required at this time.

The system will now be fully ready for use on this new network.

The SNMP configuration server's configuration service will then notify the network interface unit located in the NOC for that new network, that the VTC unit is ready for use.

The network interface unit will signal the CCS, which will in turn signal the LCS over the Ethernet link and notify the user that the VTC unit is ready for use.

These steps may be implemented as computer program instructions that are executed by processors that may be distributed in different components within the desktop multinetwork secure switching system.

An example method performed by the local control system (LCS) has the following steps:

receiving at a local control system proximate to a video teleconferencing unit, a user selection of a network to be used for a video conference;
  selectively maintaining isolation of the video teleconferencing unit from the local control system via an isolation switch;
  sending a signal from the local control system to a network switch at a network operations center to connect an IP network connection of the video teleconferencing unit to a null connection;
  receiving permission at the local control system to connect to a control interface of the video teleconferencing unit;
  data-cleaning the video teleconferencing unit by the local control system and, if necessary, forcing a reboot of the video teleconferencing unit; and
  loading basic network configuration information into the video teleconferencing unit by the local control system, issuing a reboot to the video teleconferencing unit, and disconnecting the local control system from the video teleconferencing unit.

The method performed by the local control system (LCS) may be implemented by a computer program as a sequence of programmable instructions which, when executed by a processor associated with the local control system, carries out the functions of the local control system. The example program may be stored in a computer readable medium storing computer executable program code. An example of such a program is as follows.

computer executable program code in the medium which, when executed by a processor, performs the step of receiving at a local control system proximate to a video teleconferencing unit, a user selection of a network to be used for a video conference;
  computer executable program code in the medium which, when executed by a processor, performs the step of selectively maintaining isolation of the video teleconferencing unit from the local control system via an isolation switch;
  computer executable program code in the medium which, when executed by a processor, performs the step of sending a signal from the local control system to a network switch at a network operations center to connect an IP network connection of the video teleconferencing unit to a null connection;
  computer executable program code in the medium which, when executed by a processor, performs the step of receiving permission at the local control system to connect to a control interface of the video teleconferencing unit;
  computer executable program code in the medium which, when executed by a processor, performs the step of data-cleaning the video teleconferencing unit by the local control system and, if necessary, forcing a reboot of the video teleconferencing unit; and
  computer executable program code in the medium which, when executed by a processor, performs the step of loading basic network configuration information into the video teleconferencing unit by the local control system, issuing a reboot to the video teleconferencing unit, and disconnecting the local control system from the video teleconferencing unit.

An example apparatus embodying the local control system (LCS) may be as follows.

a selection interface in a local control system configured to receive a user selection of a network to be used for a video conference at a video teleconferencing unit proximate to the local control system;
  an isolation switch coupled to the local control system configured to selectively maintain isolation of the video teleconferencing unit from the local control system;
  a processor and a memory configured with program instructions, which when executed by the processor, causes a signal to be sent from the local control system to a network switch at a network operations center to connect an IP network connection of the video teleconferencing unit to a null connection;
  the processor and memory configured to receive permission to connect the local control system to a control interface of the video teleconferencing unit;

the processor and memory configured with program instructions, which when executed by the processor, causes a data-cleaning to be performed of the video teleconferencing unit and, if necessary, causes forcing a reboot of the video teleconferencing unit; and the processor and memory configured with program instructions, which when executed by the processor, causes loading basic network configuration information into the video teleconferencing unit, issuing a reboot to the video teleconferencing unit, and disconnecting the local control system from the video teleconferencing unit.

The resulting embodiments of the invention provide manual selection of the desired network by the end point owner at his or her desk, selection of the desired network by a remote user or scheduling program, up to six different networks per end point, assured periods processing algorithm, support for multiple endpoint types, ability to select from "standard" configuration or custom configuration, and ability to select "standard" dialing directory or custom directory.

The resulting embodiments of the invention provide a multi-network secure video teleconferencing switching system that meets the DISA and other standard security requirements, but in a manner that minimizes cabling to and from VTC endpoints, minimizes the size of the equipment that must be located in an office to support the requirement, minimizes costs of implementation through inexpensive shared resources, and enhances operation, management and control across multiple networks.

DESCRIPTION OF THE FIGURES

Example embodiments of the invention are shown in the accompanying figures.

FIGS. 2A and 2B illustrate an example flow diagram of the operation of the desktop multi-network secure switching system.

FIG. 3 illustrates an example flow diagram of the operation of the local control system (LCS).

DISCUSSION OF EXAMPLE EMBODIMENTS OF THE INVENTION

Figure 1:
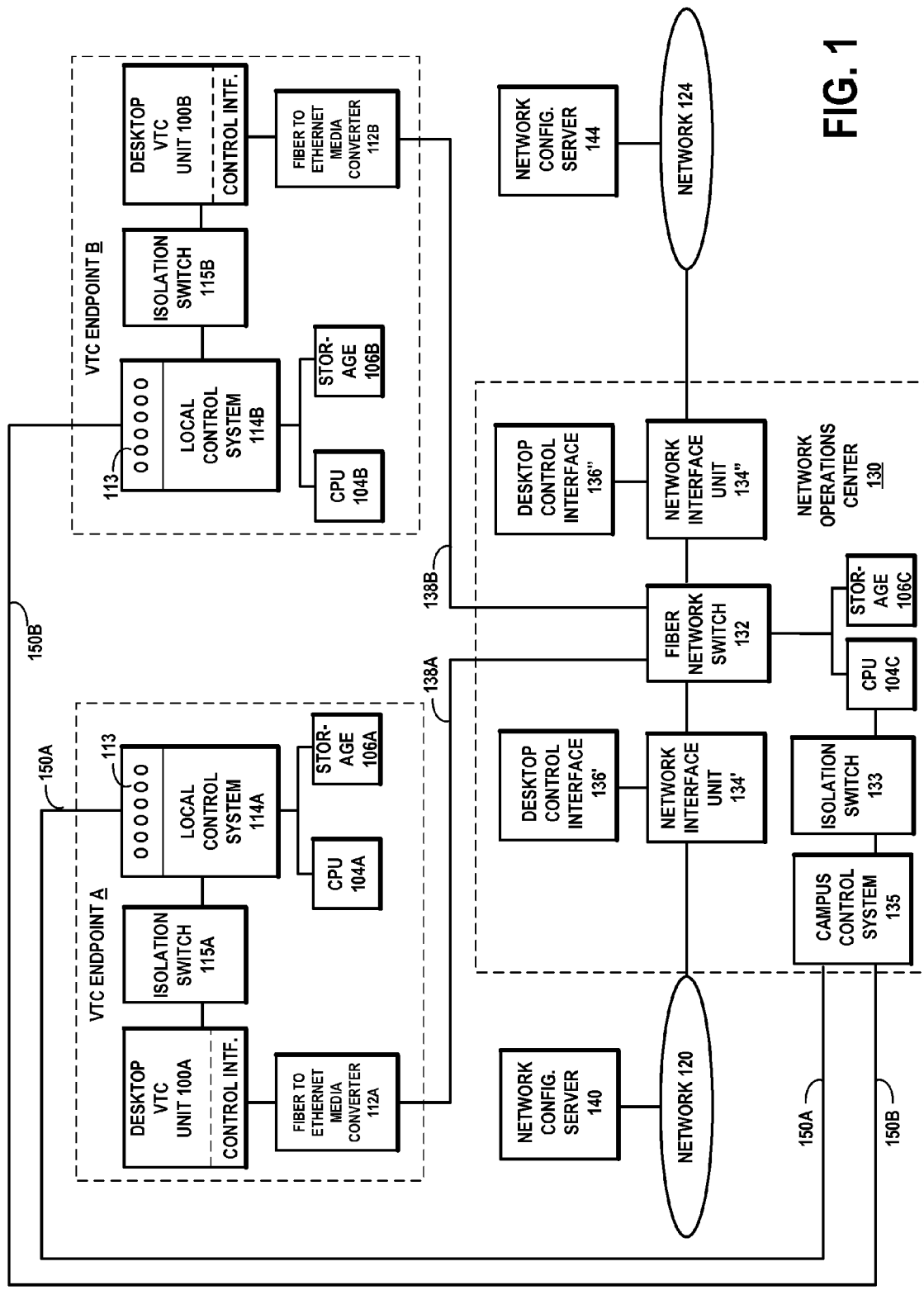
FIG. 1 is an example network diagram showing the desktop multi-network secure switching system.

FIG. 1 is an example network diagram showing the desktop multi-network secure switching system. The embodiments of the invention provide distributed components to perform the necessary operations, rather than co-locating the components in the VTC endpoint. Some system components are located with the VTC endpoint A and B, other components are placed in a network operations center (NOC) 130 and still other components are distributed on the various networks 120 and 124.

The desktop multi-network secure switching components include components required for each desktop VTC endpoint A and B, components required for the network operations center (NOC) 130 or video operations center (VOC), and components required for each network 120 and 124.

Components for each of the desktop VTC endpoints A and B, each located at a desktop, include a desktop VTC unit 100A and 100B, which may be for example, a Codec with an integrated video camera, an LCD display, a microphone and a speaker. The VTC endpoints A and B may be any device implementing H.323 or SIP and capable of being data-cleaned. Also included at each VTC endpoint A and B is a fiber to Ethernet media converter 112A and 112B, which may be a Fiber to CAT5/6 Ethernet Media Converter. These converters are typically powered through the local control system (LCS) to provide additional security. Also included at each VTC endpoint A and B is a an LCS 114A and 114B. The LCS includes a plurality of network selection buttons 113 to enable the desktop user to select which one of a corresponding plurality of networks 120 or 124 on which to he or she is interested in conferencing. The LCS interfaces to the VTC unit via a local control interface (typically an RS-232 or USB interface) and to other remote system elements via Ethernet. The LCS then controls the sequence of events to ensure that a high level of security is maintained in connecting the user's VTC unit to the selected network. The LCS has the capability to data-clean the VTC unit and to initialize it with basic network information required to get the VTC unit onto each network. The local control system (LCS) 114A or 114B and its operation are described in greater detail below. Also included at each VTC endpoint A and B is an isolation switch 115A and 115B, using fiber, relays or other air gap isolation techniques, to provide a high level of selectively switched isolation between the desktop VTC unit 100A and the LCS 114A or the desktop VTC unit 100B and the LCS 114B. When the desktop VTC unit is connected to any network, any flow of signals is prevented through the isolation switch to the LCS. This eliminates the ability of the LCS to access any network or conference information while the VTC unit is on a network. The fiber to Ethernet media converter 112A or 112B enables electrical signals from the VTC unit 100A or 100B to be converted into fiber optical signals for transmission on respective links 138A or 138B to the fiber network switch 132.

Components at for each network operations center (NOC) 130 or video operations center (VOC) include a fiber network switch (FNS) 132, a Network Interface Unit 134' and 134" for each respective supported network 120 and 124, respectively, a desktop control unit interface 136' and 136", a campus control system (CCS) 135, and optionally a desktop VTC endpoint. The campus control system (CCS) 135 is connected by an Ethernet link 150 to the local control system (LCS) 114A or 114B. An isolation switch 133, such as a fiber optic A/B switch, provides a high level of selectively switched isolation between the campus control system (CCS) 135 and the fiber network switch (FNS) 132. The fiber network switch (FNS) 132 may be an all-fiber-based switch used to securely switch a desktop VTC unit 100A, for example, to different networks 120 or 124 and provide separation between different network connections to prevent crosstalk, or bleed-over, from one connector to the other.

Components in each network include an SNMP configuration server 140 and 144 in each network 120 and 124, respectively, with stored configuration data for each desktop VTC endpoint it supports in the respective network. The SNMP configuration server is a network based server device that is located at the IP address set into the VTC unit for its SNMP address setting by the LCS. When a VTC unit comes on line, it notifies the device at the SNMP address that it has gone on line. The configuration server will key off of this event and will then configure the VTC unit. There may be a plurality of these servers on each network. Each network also includes a network server for operational software, which can optionally be included in the configuration servers 140 and 144.

There are two basic modes of system operation for the desktop multi-network secure switching system: local control and remote control. In local control, the desktop VTC endpoint user selects the network that he or she is interested in conferencing on at his or her local control system (LCS) 114A or 114B. In remote mode, a remote scheduling system (not shown) or another remote user accesses the LCS and selects the network for the user's desktop VTC endpoint 100A or 100B.

Figure 2A:
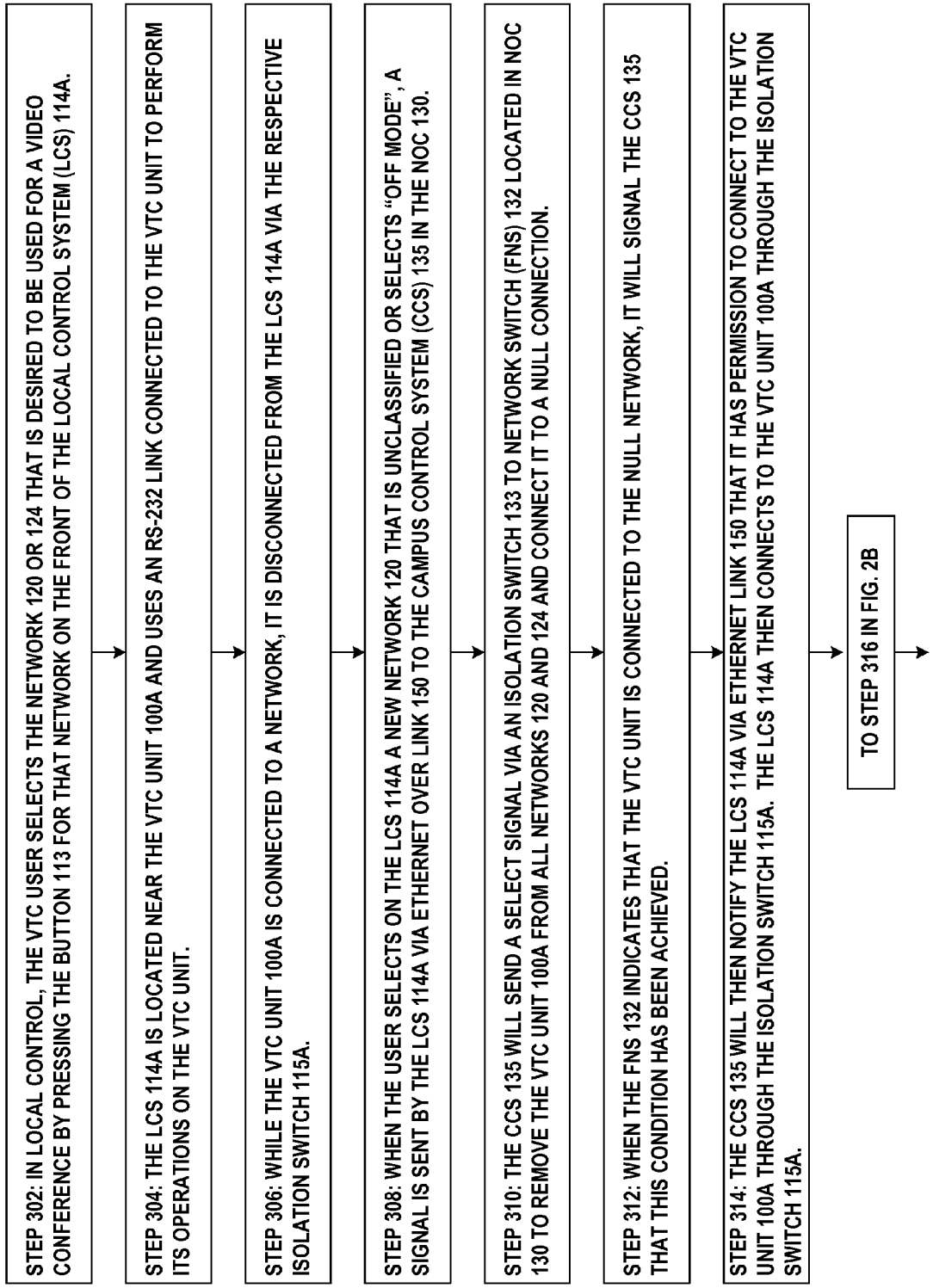

FIGS. 2A and 2B illustrate an example flow diagram of the steps 302 to 328 in the operation of the desktop multi-network secure switching system in the local control mode.

The flow diagram begins with step 302 in FIG. 2A. Step 302: in local control, the VTC user selects the network 120 or 124 that is desired to be used for a video conference by pressing the button 113 for that network on the front of the local control system (LCS) 114A or 114B. In this example, the user at desktop VTC endpoint A has completed a previous classified video teleconference on network 124 and now wishes to join an unclassified video teleconference on network 120.

Step 304: the LCS 114A is located near the VTC unit 100A and uses an RS-232 control interface connected to the VTC unit to perform its operations on the VTC unit.

Step 306: while the VTC unit 100A is connected to a network, it is disconnected from the LCS 114A via the respective isolation switch 115A.

Step 308: when the user selects on the LCS 114A a new network 120 that is unclassified or selects "off mode", a signal is sent by the LCS 114A via Ethernet over link 150 to the campus control system (CCS) 135 located in the NOC 130.

Step 310: the CCS 135 will send a select signal via an isolation switch 133 to the fiber network switch (FNS) 132 located in the NOC 130 to take (or leave) the user's VTC unit 100A off of all networks 120 and 124 and connect it to a null connection.

Step 312: when the FNS 132 indicates that the VTC unit is connected to the null network, it will signal the CCS 135 that this condition has been achieved.

Step 314: the CCS 135 will then notify the LCS 114A via Ethernet link 150 that it has permission to connect to the VTC unit 100A through the isolation switch 115A. The LCS 114A then connects to the VTC unit 100A local control interface (typically RS-232) through the isolation switch 115A.

The flow diagram continues with step 316 in FIG. 2B. Step 316: if the VTC unit 100A was previously connected to a different network 124 when the user selects a new network 120, the LCS 114A will first data-clean the VTC unit by expunging all data in the VTC unit that might be left over from the previous secure call, including logs, IP addresses, images, names, address books and the like. The LCS 114A will then force a reboot of the VTC unit 100A.

Step 318: when the reboot is complete, the LCS 114A will load a minimum network configuration into the VTC unit 100A, issue a reboot command, and disconnect from the VTC unit 100A.

Step 320: on completion of reboot, the VTC unit 100A will be connected to the new network 120 through the VTC traffic link 138A, the fiber network switch 132, and the network interface unit 134'. The VTC unit 100A will notify the SNMP configuration server 140 in the new network 120 via the respective traffic link 138A, that it has completed a reboot and now needs to have its configuration completed on the new network 120.

Step 322: the SNMP configuration server 140 will then trigger a service that will send configuration data over the traffic link 138A to the VTC unit 100A to set the proper configuration for the new network 120 that it has entered and to populate any dialing directories. In some implementations an additional reboot will be required at this point.

Step 324: the system will now be fully ready for use on this new network 120.

Step 326: the SNMP configuration server 140 configuration service will then notify the network interface unit 134' located in the NOC 130 for that respective network 120, that the VTC unit 100A is ready for use.

Step 328: the network interface unit 134' will signal the CCS 135, which will in turn signal the LCS 114A over the link 150 and the user that the VTC unit 100A is ready for use.

FIG. 3 illustrates an example flow diagram of the process 400 of the local control system (LCS) operation. An example method performed by the local control system (LCS) 114A or 114B has the following steps 402 to 412:

Step 402: receiving at a local control system proximate to a video teleconferencing unit, a user selection of a network to be used for a video conference;

Step 404: selectively maintaining isolation of the video teleconferencing unit from the local control system via an isolation switch;

Step 406: sending a signal from the local control system to a network switch at a network operations center to connect an IP network connection of the video teleconferencing unit to a null connection;

Step 408: receiving permission at the local control system to connect to a control interface of the video teleconferencing unit;

Step 410: data-cleaning the video teleconferencing unit by the local control system and, if necessary, forcing a reboot of the video teleconferencing unit; and Step 412: loading basic network configuration information into the video teleconferencing unit by the local control system, issuing a reboot to the video teleconferencing unit, and disconnecting the local control system from the video teleconferencing unit.

The method of FIG. 3 performed by the local control system (LCS) 114A, for example, may be implemented by a computer program as a sequence of programmable instructions in the storage memory 106A which, when executed by the processor 104A associated with the local control system, carries out the functions of the local control system. The example program may be stored in a computer readable medium such as memory 106A storing computer executable program code. An example of such a program is a follows.

Computer executable program code in the medium, when executed by the processor, causes receiving at a local control system 114A proximate to a video teleconferencing unit 100A, a user selection of a network 120 or 124 to be used for a video conference.

Computer executable program code in the medium, when executed by the processor, causes selectively maintaining isolation of the video teleconferencing unit from the local control system via an isolation switch 115A.

Computer executable program code in the medium, when executed by the processor, causes sending a signal from the local control system to a network switch 132 at a network operations center 130 to connect an IP network connection of the video teleconferencing unit to a null connection.

Computer executable program code in the medium, when executed by the processor, causes receiving permission at the local control system to connect to a control interface of the video teleconferencing unit.

Computer executable program code in the medium, when executed by the processor, causes data-cleaning the video teleconferencing unit by the local control system and, if necessary, forcing a reboot of the video teleconferencing unit.

Computer executable program code in the medium, when executed by the processor, causes loading basic network configuration information into the video teleconferencing unit by the local control system, issuing a reboot to the video teleconferencing unit, and disconnecting the local control system from the video teleconferencing unit.

An example apparatus embodying the local control system (LCS) 114A, for example, may be as follows.

A selection interface 113 in a local control system 114A is configured to receive a user selection of a network 120 or 124 to be used for a video conference at a video teleconferencing unit 100A proximate to the local control system.

An isolation switch 115A coupled to the local control system is configured to selectively maintain isolation of the video teleconferencing unit from the local control system.

A processor 104A and a memory 106A are configured with program instructions 400, which when executed by the processor, causes a signal to be sent from the local control system to a network switch 132 at a network operations center 130 to connect an IP network connection of the video teleconferencing unit to a null connection.

The processor 104A and a memory 106A are configured to receive permission to connect the local control system to a control interface of the video teleconferencing unit.

The processor 104A and a memory 106A are configured with program instructions, which when executed by the processor, causes a data-cleaning to be performed of the video teleconferencing unit and, if necessary, causes forcing a reboot of the video teleconferencing unit.

The processor 104A and a memory 106A are configured with program instructions, which when executed by the processor, causes loading basic network configuration information into the video teleconferencing unit, issuing a reboot to the video teleconferencing unit, and disconnecting the local control system from the video teleconferencing unit.

Figure 4:
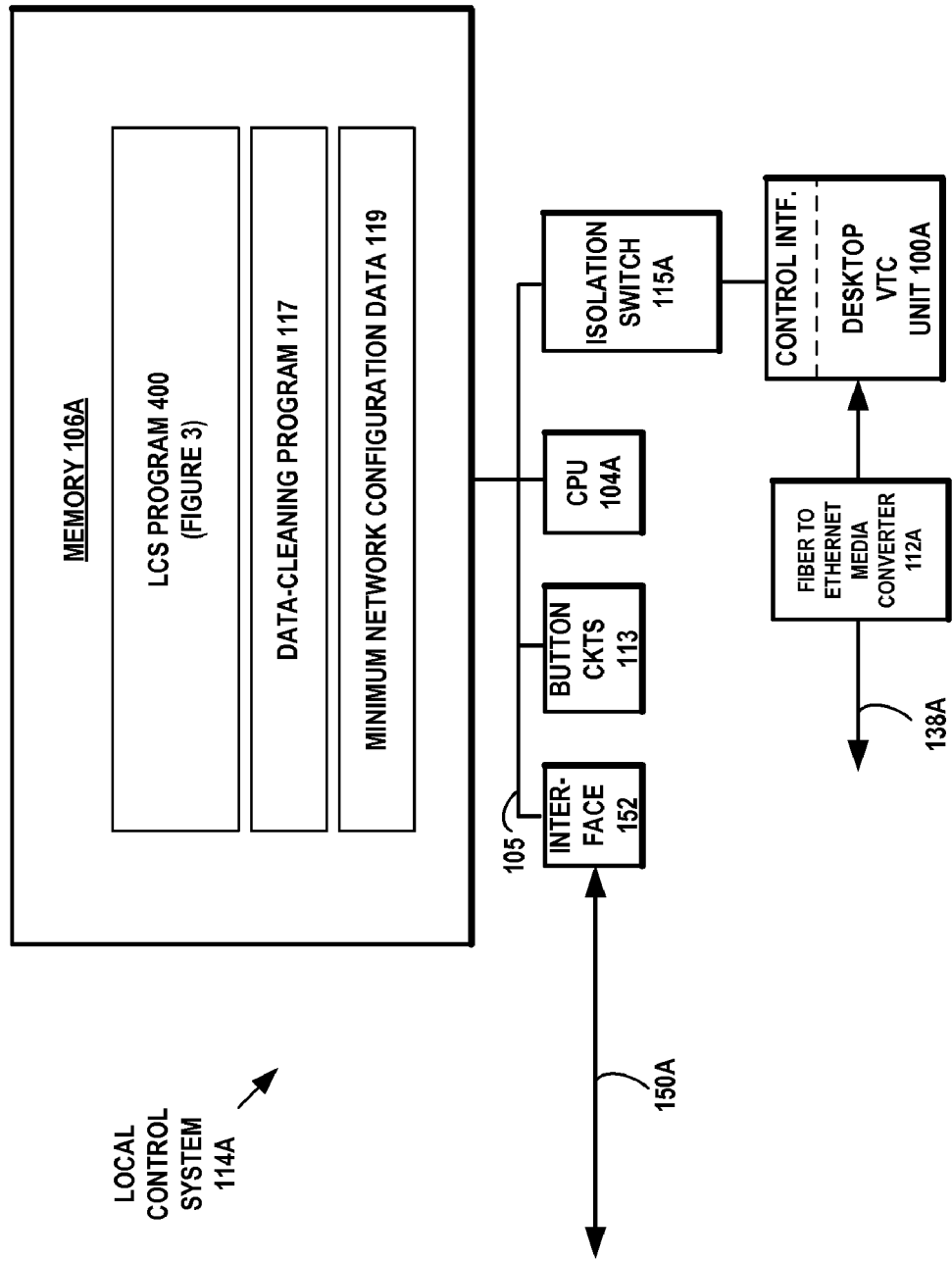
FIG. 4 is an example functional block diagram of the local control system (LCS).

FIG. 4 is an example functional block diagram of the local control system (LCS) 114A. The memory 106A is connected by the system bus 105 to the processor 104A. The LCS method of operation 400 in FIG. 3 may be implemented by a computer program stored in the memory 106A and executed by the processor 104A. The system bus 105 is also connected to the isolation switch 115A that is controlled by the processor 104A. The desktop VTC unit 100A is connected to the opposite side of the isolation switch 115A. When the programmed processor 104A controls the isolation switch 115A to open, no signals can flow between the desktop VTC unit through the switch to the system bus 105 of the LCS 114A. In the closed state, the isolation switch 115A, signals can flow between the desktop VTC unit through the switch to the system bus 105 of the LCS 114A. The circuits for the selection buttons 113 are connected to the system bus 105 to enable the desktop user to select which one of a corresponding plurality of networks 120 or 124 on which to he or she is interested in conferencing. Interface 152 is connected to the system bus 105 and is connected to the Ethernet link 150. When the user selects a network 120 or 124 with the buttons 113, a selection signal is sent by the interface 152 and via Ethernet over control link 150A from the LCS 114A to the campus control system (CCS) 135 located in the NOC 130. The CCS 135 will then notify the LCS 114A via Ethernet link 150A that it has permission to connect to the VTC unit 100A through the isolation switch 115A. The LCS 114A then connects to the VTC unit 100A through the isolation switch 115A. The LCS 114A will data-clean the VTC unit with data-cleaning program 117 by expunging all data in the VTC unit that might be left over from the previous secure call, including logs, IP addresses, images, names, address books and the like. The LCS 114A will then force a reboot of the VTC unit 100A. When the reboot is complete, the LCS 114A will load minimum network configuration data 119 into the VTC unit 100A, issue a reboot command, and disconnect from the VTC unit 100A. The fiber to Ethernet media converter 112A or 112B enables electrical signals from the VTC unit 100A or 100B to be converted into fiber optical signals for transmission on respective links 138A or 138B to the fiber network switch 132.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

The resulting embodiments of the invention provide a multi-network secure video teleconferencing switching system that meets the DISA and other standard security requirements, but in a manner that minimizes cabling to and from VTC endpoints, minimizes the size of the equipment that must be located in an office to support the requirement, minimizes costs of implementation through inexpensive shared resources, and enhances operation, management and control across multiple networks.

Although example embodiments of the invention have been disclosed, a person skilled in the art will understand that changes can be made to the example embodiments without departing from the spirit and scope of the invention.

What is claimed is:
1. A method, comprising:
receiving at a local control system coupled to a video teleconferencing unit, a user selection of a network to be used for a video conference;
isolating of the video teleconferencing unit from the local control system via an isolation switch, to prevent any flow of signals from the video teleconferencing unit to the local control system;
sending a signal from the local control system to a network switch at a network operations center remote from the local control system, to connect an IP network connection of the video teleconferencing unit to a null connection;
receiving permission at the local control system from the remote network operations center, to connect to a control interface of the video teleconferencing unit;
data-cleaning the video teleconferencing unit by the local control system, to expunge data in the video teleconferencing unit left over from a previous call; and
loading basic network configuration information into the video teleconferencing unit by the local control system, issuing a reboot to the video teleconferencing unit, and disconnecting the local control system from the video teleconferencing unit;

said local control system and video teleconferencing unit being part of a desktop video teleconferencing endpoint located at a desktop at a different location than said network operations center.

2. The method of claim 1, further comprising:

said local control system sending said signal to a campus control system at a different location than said local control system when the user selects a new network, for forwarding information related to said signal to the network switch to remove the user's video teleconferencing unit from all networks.

3. The method of claim 1, said data cleaning further comprising:

expunging all data in the video teleconferencing unit left over from a previous secure call, including logs, IP addresses, images, names, and address books.

4. The method of claim 1, further comprising:

receiving notification from a campus control system at a different location than said local control system, indicating that the video teleconferencing unit is ready for use with the new network.

5. A computer readable medium, comprising:

a computer readable non-transitory medium storing computer executable program code;

computer executable program code in the medium which, when executed by a processor, performs the step of receiving at a local control system coupled to a video teleconferencing unit, a user selection of a network to be used for a video conference;

computer executable program code in the medium which, when executed by a processor, performs the step of isolating of the video teleconferencing unit from the local control system via an isolation switch, to prevent any flow of signals from the video teleconferencing unit to the local control system;

computer executable program code in the medium which, when executed by a processor, performs the step of sending a signal from the local control system to a network switch at a network operations center remote from the local control system, to connect an IP network connection of the video teleconferencing unit to a null connection;

computer executable program code in the medium which, when executed by a processor, performs the step of receiving permission at the local control system from the remote network operations center, to connect to a control interface of the video teleconferencing unit;

computer executable program code in the medium which, when executed by a processor, performs the step of data-cleaning the video teleconferencing unit by the local control system, to expunge data in the video teleconferencing unit left over from a previous call; and computer executable program code in the medium which, when executed by a processor, performs the step of loading basic network configuration information into the video teleconferencing unit by the local control system, issuing a reboot to the video teleconferencing unit, and disconnecting the local control system from the video teleconferencing unit;

said local control system and video teleconferencing unit being part of a desktop video teleconferencing endpoint located at a desktop at a different location than said network operations center.

6. The computer readable medium of claim 5, further comprising:

computer executable program code in the medium which, when executed by a processor, performs the step of sending said signal to a campus control system at a different location than said local control system when the user selects a new network, for forwarding information related to said signal to the network switch to remove the user's video teleconferencing unit from all networks.

7. The computer readable medium of claim 5, further comprising:

computer executable program code in the medium which, when executed by a processor, performs the step of expunging all data in the video teleconferencing unit left over from a previous secure call, including logs, IP addresses, images, names, and address books.

8. The computer readable medium of claim 5, further comprising:

computer executable program code in the medium which, when executed by a processor, performs the step of receiving notification from a campus control system a different location than said local control system, indicating that the video teleconferencing unit is ready for use with the new network.

9. An apparatus, comprising:

a selection interface in a local control system configured to receive a user selection of a network to be used for a video conference at a video teleconferencing unit coupled to the local control system;

an isolation switch coupled to the local control system configured to isolate of the video teleconferencing unit from the local control system, to prevent any flow of signals from the video teleconferencing unit to the local control system;

a processor and a memory configured with program instructions, which when executed by the processor, causes a signal to be sent from the local control system to a network switch at a network operations center remote from the local control system, to connect an IP network connection of the video teleconferencing unit to a null connection;

the processor and memory configured to receive permission from the remote network operations center, to connect the local control system to a control interface of the video teleconferencing unit;

the processor and memory configured with program instructions, which when executed by the processor, causes a data-cleaning to be performed of the video teleconferencing unit, to expunge data in the video teleconferencing unit left over from a previous call; and the processor and memory configured with program instructions, which when executed by the processor, causes loading basic network configuration information into the video teleconferencing unit, issuing a reboot to the video teleconferencing unit, and disconnecting the local control system from the video teleconferencing unit;

said local control system and video teleconferencing unit being part of a desktop video teleconferencing endpoint located at a desktop at a different location than said network operations center.

10. The apparatus of claim 9, further comprising:
the processor and memory configured to send said signal to a campus control system at a different location than said local control system when the user selects a new network, for forwarding information related to said signal to the network switch to remove the user's video teleconferencing unit from all networks.

11. The apparatus of claim 9, further comprising:
the processor and memory configured to expunge all data in the video teleconferencing unit left over from a previous secure call, including logs, IP addresses, images, names, and address books.

12. The apparatus of claim 9, further comprising:
the processor and memory configured to receive notification from a campus control system a different location than said local control system, indicating that the video teleconferencing unit is ready for use with the new network.

* * * * *